(12) United States Patent
Markham et al.

(10) Patent No.: US 10,436,227 B2
(45) Date of Patent: Oct. 8, 2019

(54) SEALING DEVICE FOR JET PUMP SLIP JOINTS

(71) Applicant: Framatome Inc., Lynchburg, VA (US)

(72) Inventors: Kenneth Wade Markham, Forest, VA (US); Charles Allen Graves, Forest, VA (US)

(73) Assignee: Framatome Inc., Lynchburg, VA (US)

( * ) Notice: Subject to any disclaimer, the term of this patent is extended or adjusted under 35 U.S.C. 154(b) by 312 days.

(21) Appl. No.: 14/885,109

(22) Filed: Oct. 16, 2015

(65) Prior Publication Data

US 2017/0108013 A1 Apr. 20, 2017

(51) Int. Cl.
*F04F 5/44* (2006.01)
*F04F 5/46* (2006.01)
*F04F 5/10* (2006.01)
*G21C 15/25* (2006.01)

(52) U.S. Cl.
CPC .............. *F04F 5/463* (2013.01); *F04F 5/10* (2013.01); *F04F 5/44* (2013.01); *G21C 15/25* (2013.01); *Y02E 30/31* (2013.01)

(58) Field of Classification Search
CPC ..... G21C 15/25; G21Y 2004/301; F04F 5/04; F04F 5/44; F04F 5/46; F04F 5/463
See application file for complete search history.

(56) References Cited

U.S. PATENT DOCUMENTS 4,468,172 A * 8/1984 Dixon ................. F04F 5/00
239/578
5,339,861 A * 8/1994 Smith, III ............ F16L 37/32
137/614.04

(Continued)

FOREIGN PATENT DOCUMENTS

| EP | 2778434 A2 * | 9/2014 | ............. F04F 5/10 |
| JP | 2010169545 A * | 8/2010 | |
| JP | 2014199243 A * | 10/2014 | ............. F04F 5/10 |

*Primary Examiner* — Charles G Freay
*Assistant Examiner* — Thomas Fink
(74) *Attorney, Agent, or Firm* — Davidson, Davidson & Kappel, LLC (57) ABSTRACT

A sealing device for a jet pump of a boiling water reactor is provided. The jet pump includes an inlet mixer and a diffuser receiving the inlet mixer at a slip joint such that an outer circumferential surface of the inlet mixer is received in an inner circumferential surface of the diffuser at the slip joint. The diffuser includes a plurality of guiding fins, each guiding fin including a radially inner surface, a radially outer surface and lateral surfaces extending radially between the inner and outer surfaces. The sealing device includes a seal configured for sealingly contacting the outer circumferential surface of the inlet mixer and a collar configured for holding the seal against the outer circumferential surface of the inlet mixer. The collar includes portions configured for being received radially between the radially inner surfaces of the guiding fins and the outer circumferential surface of the inlet mixer. The sealing device further includes a clamp configured for contacting the radially outer surfaces of the guiding fins to axially clamp the guiding fins. A method of mounting a sealing device onto a slip joint of a jet pump of a boiling water reactor is also provided.

18 Claims, 6 Drawing Sheets

(56) References Cited

U.S. PATENT DOCUMENTS

| | | | | |
|---|---|---|---|---|
| 6,394,765 B1* | 5/2002 | Erbes | F04F 5/44 | 248/230.6 |
| 6,435,839 B1* | 8/2002 | Erbes | F04F 5/44 | 248/73 |
| 6,438,192 B1* | 8/2002 | Erbes | F16J 13/06 | 277/379 |
| 7,023,949 B2* | 4/2006 | Wivagg | G21C 15/25 | 105/198.4 |
| 8,197,225 B2 | 6/2012 | Bass | | |
| 8,475,139 B2 | 7/2013 | Sprague et al. | | |
| 8,605,852 B2* | 12/2013 | Flanigan | G21C 13/032 | 376/372 |
| 8,701,258 B2* | 4/2014 | Koepke | B23K 37/0435 | 29/402.09 |
| 8,819,911 B2* | 9/2014 | Sprague | G21C 15/25 | 29/283 |
| 8,964,929 B2 | 2/2015 | Sprague et al. | | |
| 2002/0085662 A1* | 7/2002 | Erbes | F16L 3/16 | 376/407 |
| 2002/0106281 A1* | 8/2002 | Erbes | F04F 5/44 | 417/151 |
| 2008/0205578 A1* | 8/2008 | Abura | G21C 15/25 | 376/372 |
| 2010/0316180 A1* | 12/2010 | Lentner | F04F 5/54 | 376/260 |
| 2011/0135049 A1* | 6/2011 | Wroblewski | F04F 5/54 | 376/372 |
| 2011/0176938 A1* | 7/2011 | DeFilippis | F04F 5/466 | 417/151 |
| 2012/0012728 A1* | 1/2012 | Bass | F04F 5/54 | 248/617 |
| 2012/0018612 A1* | 1/2012 | DeFilippis | F04F 5/44 | 248/670 |
| 2012/0033782 A1* | 2/2012 | DeFilippis | G21C 15/25 | 376/372 |
| 2012/0057992 A1* | 3/2012 | Sprague | F04F 5/44 | 417/54 |
| 2012/0112036 A1* | 5/2012 | Sprague | G21C 15/25 | 248/674 |
| 2012/0155598 A1* | 6/2012 | Lentner | G21C 15/25 | 376/392 |
| 2012/0163527 A1* | 6/2012 | Sprague | G21C 15/25 | 376/372 |
| 2012/0170703 A1* | 7/2012 | Sprague | G21C 13/032 | 376/372 |
| 2012/0170704 A1* | 7/2012 | Sprague | G21C 13/032 | 376/372 |
| 2012/0227834 A1* | 9/2012 | Parker | F16L 3/1211 | 137/343 |
| 2013/0308739 A1* | 11/2013 | Bass | G21C 13/032 | 376/372 |
| 2014/0079468 A1* | 3/2014 | Jensen | F04F 5/46 | 403/188 |
| 2014/0109406 A1* | 4/2014 | Golden | G21C 19/207 | 29/888.021 |
| 2015/0159790 A1 | 6/2015 | Markham | | |
| 2015/0240838 A1* | 8/2015 | Watanabe | F04F 5/54 | 417/151 |
| 2016/0024860 A1* | 1/2016 | Semple | E21B 17/1035 | 166/386 |

* cited by examiner

SEALING DEVICE FOR JET PUMP SLIP JOINTS

The present disclosure relates generally to a jet pump of a boiling water nuclear reactor and more specifically to a sealing device for linking an inlet mixer and jet diffuser and reducing jet pump slip joint vibration.

BACKGROUND

Jet pumps are used to circulate a coolant fluid, such as water, through the fuel core of a boiling water nuclear reactor. The jet pumps are located in a downcomer annulus between a shroud surrounding the core and the interior of the pressure vessel where the coolant is forced into the inlet end or bottom of the core. A slip joint is used along the length of the jet pump typically to accommodate differential thermal expansion that may occur along the jet pump. The slip joint typically has a narrow gap between two nearly concentric cylinders through which coolant fluid may pass under differential pressure.

Boiling water reactor jet pumps experience flow induced vibrations. Flow induced vibration occurs in leakage flow situations under certain circumstances such as flow through a narrow passage with a differential pressure imposed, among which include the BWR slip joint.

U.S. Pat. Nos. 6,394,765, 6,438,192, 8,197,225, 8,475,139, 8,964,929, U.S. Pub No. 2014/0079468 and U.S. Pub. No. 2015/0159790 disclose assemblies for jet pump slip joints

SUMMARY OF THE INVENTION

An object of the present invention is to address slip joint leakage and prevent damage from the flow induced vibration at slip joints, while achieving a strong mechanical linkage of the mixer and the diffuser.

A sealing device for a jet pump of a boiling water reactor is provided. The jet pump includes an inlet mixer and a diffuser receiving the inlet mixer at a slip joint such that an outer circumferential surface of the inlet mixer is received in an inner circumferential surface of the diffuser at the slip joint. The diffuser includes a plurality of guiding fins, each guiding fin including a radially inner surface, a radially outer surface and lateral surfaces extending radially between the inner and outer surfaces. The sealing device includes a seal configured for sealingly contacting the outer circumferential surface of the inlet mixer and a collar configured for holding the seal against the outer circumferential surface of the inlet mixer. The collar includes portions configured for being received radially between the radially inner surfaces of the guiding fins and the outer circumferential surface of the inlet mixer. The sealing device further includes a clamp configured for contacting the radially outer surfaces of the guiding fins to axially clamp the guiding fins.

In one or more embodiments, the sealing device may include one or more of the following features:
the collar includes a support ring having a circumferentially extending groove formed in an inner circumferential surface thereof holding the seal;
the clamp includes a plurality of grooves each being contoured to contact the radially outer surface of a respective one of the guiding fins;
the clamp is formed by a plurality of clamp sections, each of the clamp sections including a fin engagement section being configured for contacting the radially outer surface of a respective one of the guiding fins;

each of the clamp sections includes a first fastener connected to the collar configured for axially moving the respective fin engagement section toward the respective fin;
the collar includes a plurality of first connectors, each of the first connectors receiving one of the first fasteners;
each of the fin engagement sections is pivotable about the respective first fastener when the fin engagement section is in a movable orientation to allow each fin engagement section to be pivotable toward and away from the respective guiding fin;
each of the clamp sections includes a second fastener extending upwardly from a top surface of the respective fin engagement section, the collar including a plurality of second connectors, each of the second fasteners being received in a respective one of the second connectors in a clamping orientation of the respective clamp section;
the radially outer surface of each of the guiding fins includes a tapered section extending from an outer circumferential surface of the diffuser and an axially extending section extending axially from a radially outer end of the tapered section, the clamp contacting the tapered section;
a further seal connected to the collar below the seal, the further seal configured for sealingly contacting the outer circumferential surface of the inlet mixer below;
a bottom edge of the collar is configured for contacting the inner circumferential surface of the diffuser.

A method of mounting a sealing device onto a slip joint of a jet pump of a boiling water reactor is also provided. The slip joint is defined by an outer circumferential surface of an inlet mixer being received in an inner circumferential surface of a diffuser. The diffuser includes a plurality of guiding fins, each guiding fin including a radially inner surface, a radially outer surface and lateral surfaces extending radially between the inner and outer surfaces. The method includes fixing a collar of the sealing device onto the outer circumferential surface of the inlet mixer such that a seal held by the collar is compressed radially against the outer circumferential surface of the inlet mixer by the collar and portions of the collar are received radially between the radially inner surfaces of the guiding fins and the outer circumferential surface of the inlet mixer; and forcing a clamp of the sealing device axially against the radially outer surfaces of the guiding fins to axially clamp the guiding fins.

In one or more embodiments, the method may include one or more of the following features:
providing the collar onto the outer circumferential surface of the inlet mixer such that each of the guiding fins is partially received in one of a plurality of axially extending grooves in an outer circumferential surface of the collar;
the providing the collar onto the outer circumferential surface of the inlet mixer includes holding a further seal held by the collar onto the outer circumferential surface of the inlet mixer below the seal;
the providing the collar onto the outer circumferential surface of the inlet mixer includes holding a bottom edge of the collar axially against the inner circumferential surface of the diffuser;
the seal includes at least one cylindrical metal tube, the fixing the collar of the sealing device onto the outer circumferential surface of the inlet mixer including radially compressing the at least one cylindrical metal tube on the outer circumferential surface of the inlet mixer such that the at least one cylindrical metal tube permanently deforms around the inlet mixer;
the clamp includes a plurality of clamp sections each including a first fastener and a fin engagement section, the forcing the clamp of the sealing device axially against the radially outer surfaces of the guiding fins to axially clamp the guiding fins includes forcing, via each of the first fasteners, an angled surface of the respective fin engagement section axially against a tapered section of the radially outer surface of the respective guiding fin;

each of the clamp sections includes a second fastener, the forcing the clamp of the sealing device axially against the radially outer surfaces of the guiding fins to axially clamp the guiding fins includes forcing the second fasteners into bores in the collar.

BRIEF DESCRIPTION OF THE DRAWINGS

The present invention is shown with respect to the drawings in which.

DETAILED DESCRIPTION

Known slip joint assemblies do not address leakage and prevent damage from the flow induced vibration, while achieving a strong mechanical linkage of the mixer and the diffuser. Some assemblies restrict the flow from the slip joint but do not restrain the components in any way. Embodiments of the present invention include a metal o-ring to seal against the jet pump mixer and swing clamp sections on the body of the repair to engage the diffuser to secure the assembly together. A seal feature is also included in the lower edge of the collar to seal against the counter-bore of the diffuser. The combination of seals and the restraint features provide advantages with respect to addressing leakage and preventing damage from the flow induced vibration, while achieving a strong mechanical linkage of the mixer and the diffuser, thus providing a restraint system that locks the inlet mixer and diffuser together while still allowing thermal growth in the axial direction.

Figure 1:
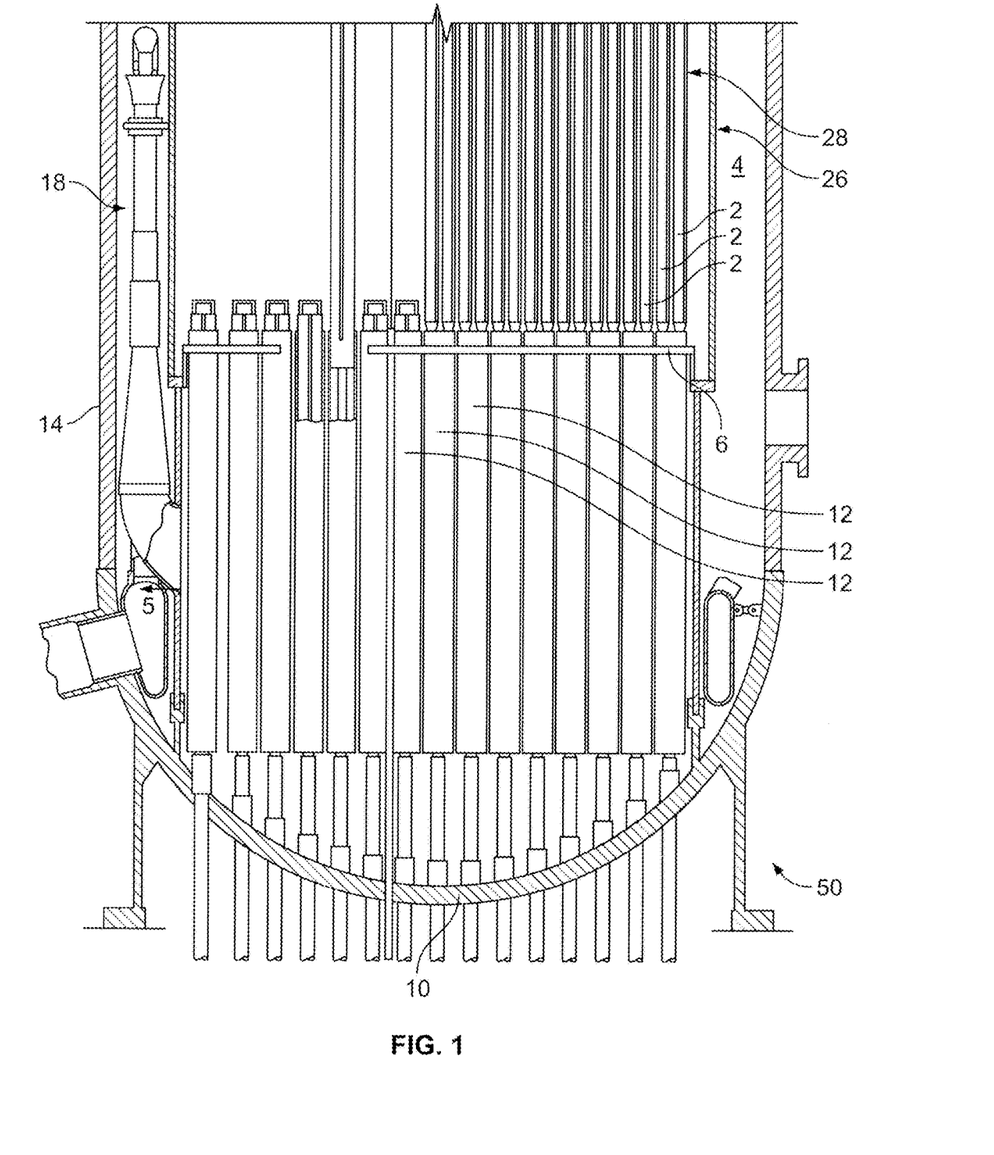
FIG. 1 schematically shows the lower portion of a boiling water nuclear reactor.

FIG. 1 schematically shows the lower portion of a boiling water nuclear reactor 50. Reactor 50 includes a pressure vessel 14 closed at a lower end by a dish shaped bottom head 10. A shroud 26 is located radially inside of pressure vessel 14. Between a wall of pressure vessel 14 and shroud 26 is a downcomer annulus 4. A reactor core fuel assembly 28 is housed inside of shroud 26, which comprises fuel assemblies 2. Fuel assemblies 2 may be arranged in groups of four, with each group being attached to guide tubes 12 at lower ends of fuel assemblies 2. Upper ends of guide tubes 12 are sealed by a horizontal bottom grid plate 6 mounted across the bottom of shroud 26. Multiple jet pumps 18, one of which is shown schematically in FIG. 1, are mounted in downcomer annulus 4 circumferentially spaced about shroud 26.

Figure 2:
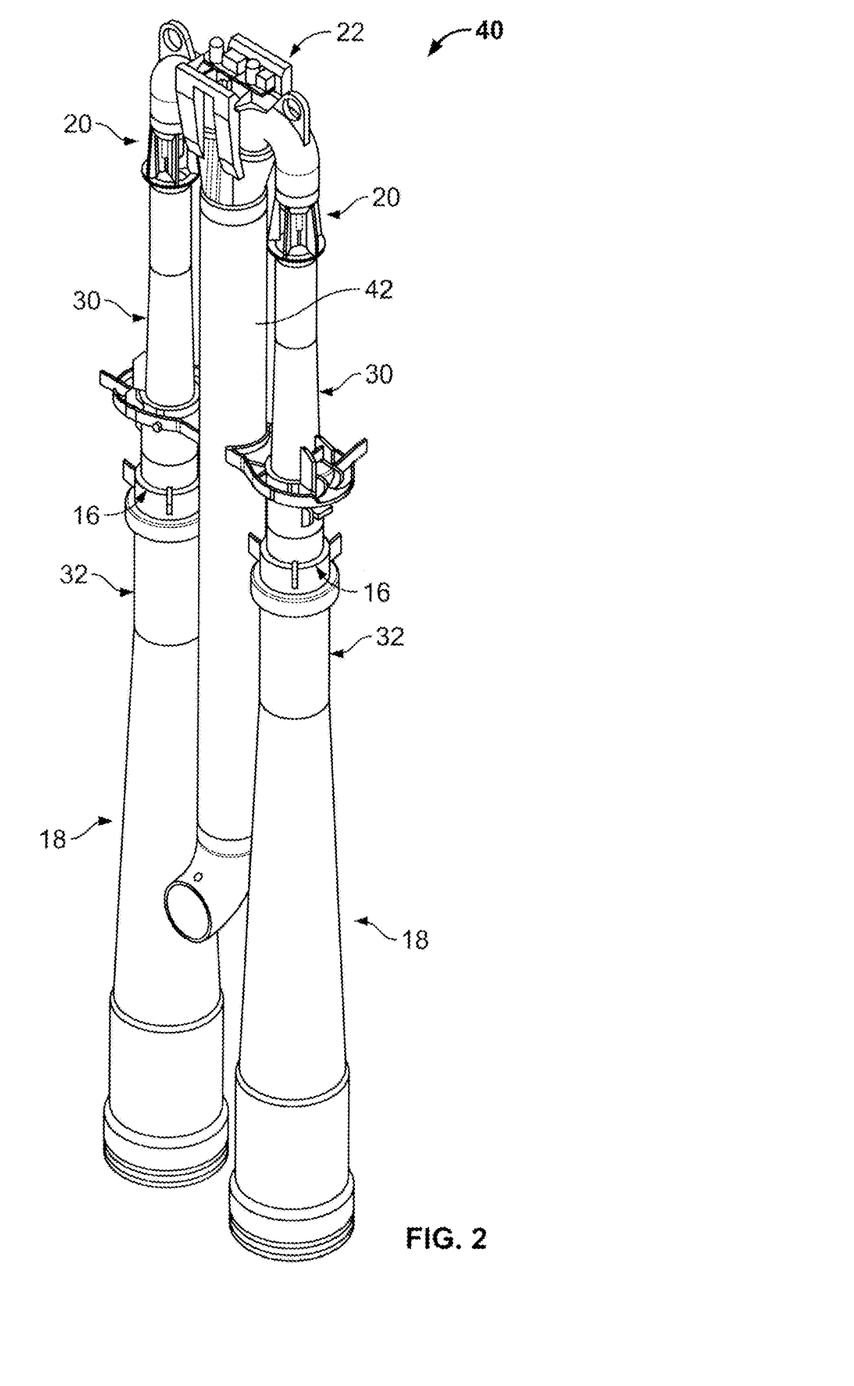
FIG. 2 shows an isometric view of a jet pump assembly.

FIG. 2 shows an isometric view of a jet pump assembly 40. Jet pump assembly 40 includes two jet pumps 18 that are coupled to a riser pipe 42 by a ram's head 22. Water enters riser pipe 42, passes through ram's head 22 and is then driven downward into an inlet mixer 30 by drive nozzles 20. Inlet mixer 30 merges with a diffuser 32 at a slip joint 16, with inlet mixer 30 being independently supported with respect to diffuser 32 so that inlet mixer 30 is longitudinally slidable with respect to diffuser 32.

Figure 3A:
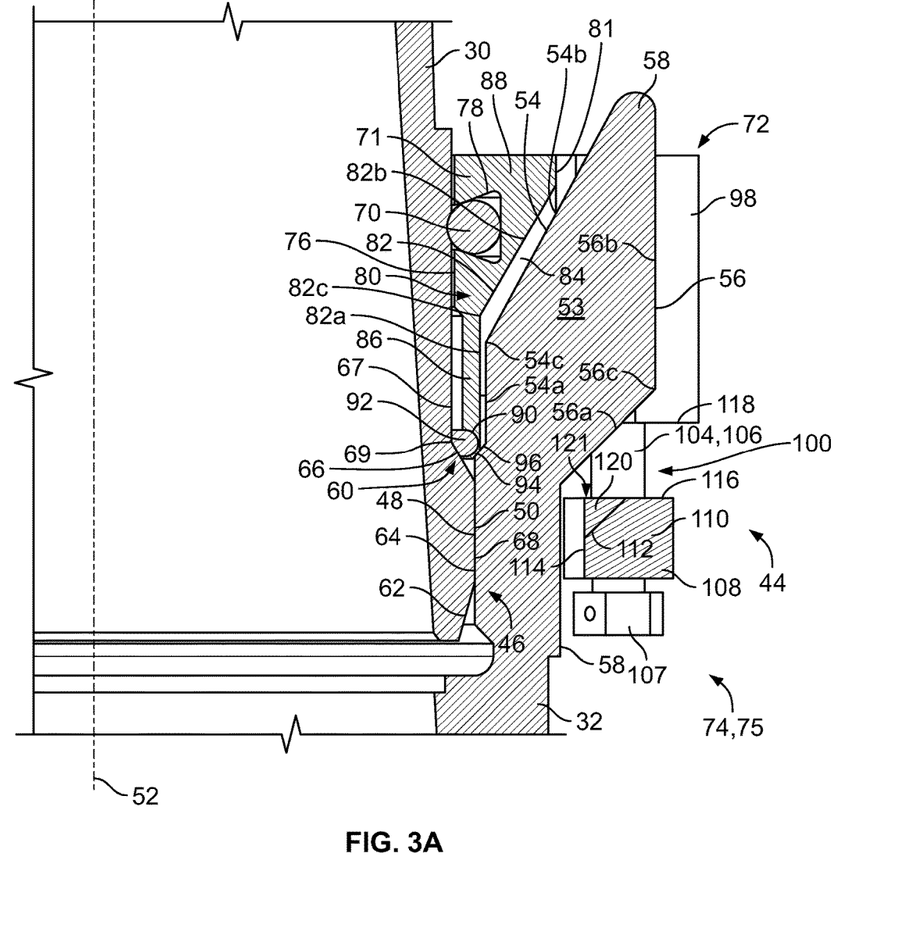
FIG. 3a shows a cross-sectional side view of a sealing device in accordance with an embodiment of the present invention fixed to the bottom of an inlet mixer and the top of a diffuser.

FIG. 3a shows a cross-sectional side view of a sealing device 44 in accordance with an embodiment of the present invention fixed to the bottom of inlet mixer 30 and the top of diffuser 32. A top end of diffuser 32 receives a bottom end of inlet mixer 30 at a slip joint 46 such that an outer circumferential surface 48 of inlet mixer 30 is received in an inner circumferential surface 50 of diffuser 32 at slip joint 46. Diffuser 32 and inlet mixer 30 are coaxially arranged on a center axis 52. As used herein, the terms radially, axially and circumferentially are used with respect to center axis 52. Diffuser 32, at the top end thereof, includes a plurality of upwardly and radially outwardly protruding guiding fins 53. Each guiding fin 53 includes a radially inner surface 54, a radially outer surface 56 and two lateral surfaces 58 extending radially between the inner and outer surfaces 54, 56 on opposite sides of each fin 53. Radially inner surfaces 54 each include a first section 54a, extending axially and parallel to center axis, and a second section 54b, tapering radially outward from a top edge of first section 54a, with sections 54a, 54b being joined together at an elbow 54c. Radially outer surfaces 56 each include a first section 56a tapering radially outward from an outer circumferential surface 58 of the diffuser and an second section 56b extending axially from a radially outermost and top edge of first section 56a, with sections 56a, 56b being joined together at an elbow 56c.

Tapering radially outward from a bottom edge 60 of inlet mixer 30, and just below slip joint 46, inlet mixer 30 includes a lead-in portion 62 to allow for ease of inserting inlet mixer 30 into diffuser 32. Above lead-in portion 62, outer circumferential surface 48 includes an inner slip joint surface 64 extending parallel to center axis 52. Tapering radially outward from the top of inner slip joint surface 64, outer circumferential surface 48 of inlet mixer 30 includes a frustoconical surface 66, a top edge of which transitions into an axially extending portion 67 at an elbow 69. Facing inner slip joint surface 64, inner circumferential surface 50 of diffuser 32 includes an outer slip joint surface 68 also extending parallel to center axis 52, with surfaces 64, 68 defining slip joint 46. As water is forced downward through inlet mixer 30 into diffuser 32, leakage can occur upward through slip joint 46, causing inlet mixer 30 to oscillate laterally, which causes inlet mixer 30 and diffuser 32 to disadvantageously vibrate and potentially impact each other.

In order to address leakage at slip joint 46 and prevent damage from flow induced vibrations, while achieving a strong mechanical linkage of mixer 30 and diffuser 32, sealing device 44 is provided on mixer 30 and diffuser 32. Sealing device 44 includes a first seal 70 configured for sealingly contacting outer circumferential surface 48 of inlet mixer 30, a collar 72 configured for clamping first seal 70 radially against outer circumferential surface 48 of inlet mixer 30 and a clamp 74 configured for contacting radially outer surfaces 56 of guiding fins 53 to axially clamp guiding fins 53. Clamp 74 is formed of a plurality of individual clamp sections 75, one of which is shown in FIG. 3a. Collar 72 includes an inner circumferential surface 76 including a circumferentially extending dovetail groove 78 formed therein holding first seal 70. Inner circumferential surface 76 surrounds outer circumferential surface 48 of inlet mixer 30 above slip joint 46. Collar 72 includes a cylindrically shaped ring 71 and a plurality of connecting features, which are described in further details with respect to FIGS. 4a to 5, protruding radially outward from outer circumferential surface 81 of ring 71.

Ring 71 includes a plurality of grooves 80 in outer circumferential surface 81 thereof, with each groove 80 receiving one of guiding fins 53. Grooves 80 are contoured to portions of sections 54a, 54b of radially inner surfaces 54 and receive elbow 54c. More specifically, grooves 80 includes a radially inner surface 82 including first section 82a, extending axially and parallel to center axis 52, and a second section 82b, tapering radially outward from a top edge of first section 82a, with sections 82a, 82b being joined together at an elbow 82c. Grooves 80 also each include two lateral surfaces 84 extending radially outward from surface 82 on opposite sides of each groove 80, with each lateral surface 84 facing one of the lateral surfaces 58 of the respective fin 53. Grooves 80 are each defined by a bottom section 86 of ring 71 and a top section 88 of ring 71. Bottom section 86, at each fin 53, has an axially extending elongated shape and is positioned radially between outer circumferential surface 48 of inlet mixer 30, above slip joint 46, and first section 54a of radially inner surface 54 of fin 53. At the bottom end of thereof, bottom section 86 includes a circumferentially extending groove 90 holding a second seal 92 against of elbow 69 and surfaces 66, 67 adjacent to elbow 69. The bottom end of bottom section 86, at a bottom edge of radially inner surface 82, further includes a frustoconical surface 94 for contacting a frustoconical surface 96 of inner circumferential surface 50 of diffuser 32. Top section 88, at each fin 53, has a wedge shape, which includes the dovetail groove 78 holding first seal 70. For jet pumps that do not have a counter-bore in the diffuser, seal 92 may be omitted and the collar may be clamped to the top surface of the diffuser to provide a seal that is restricts leakage but may still have leak paths around the diffuser guiding fins.

FIG. 3a shows a connecting feature, specifically one of first connectors 98, protruding radially outward from outer circumferential surface 81 of ring 71. Connector 98 includes an axially extending bore 99 (FIGS. 4a to 5) passing entirely therethrough formed receiving a first fastener 100, which in this embodiment is a shoulder screw, of clamp 74. Shoulder screw 100 includes a head 102 (FIGS. 4a to 5) resting on top of a shoulder inside of bore 99 in connector 98. Protruding downward from connector 98, shoulder screw 100 includes threaded portion 104 of a shaft 106. A fin engagement section 108 of clamp 74 is connected to threaded portion 104, by a corresponding threaded bore receiving threaded portion 104. A retainer 107 is provided at the bottom end of shoulder screw 100, below threaded portion 104, for preventing fin engagement section 106 from coming off of shoulder screw 100. Above threaded portion 104, and below head 102, shoulder screw 100 includes a smooth portion allowing shoulder screw 100 to freely rotate in the bore of connector 98. Rotation of shoulder screw 100, via engagement of head 102 with an appropriate tool, causes fin engagement section 108, via engagement of the threads of its threaded bore with threaded portion 104, to upward or downward depending on the direction of rotation. Fin engagement section 108 is formed as a bar extending in the horizontal direction including a wedge section 110 having an angled surface 112 angled at the same angle as first section 56a of radially outer surface 56. Angled surface 112 is recessed with respect to a radially inner surface 114 of fin engagement section 108, which faces outer circumferential surface 58 of diffuser 32, and a top surface 116 of fin engagement section 108, which faces a bottom surface 118 of connector 98. Two inner lateral walls 120, which face each other and each extend from angled surface 112 to surfaces 114, 116, and angled surface 112 define a wedge-shaped groove 121 in fin engagement section 108 for receiving fin 53, more specifically first section 56a of radially outer surface 56. In the view shown in FIG. 3a, clamp 74 is in a non-clamping orientation, with angled surface 112 being spaced apart from first section 56a of radially outer surface 56.

Figure 3B:
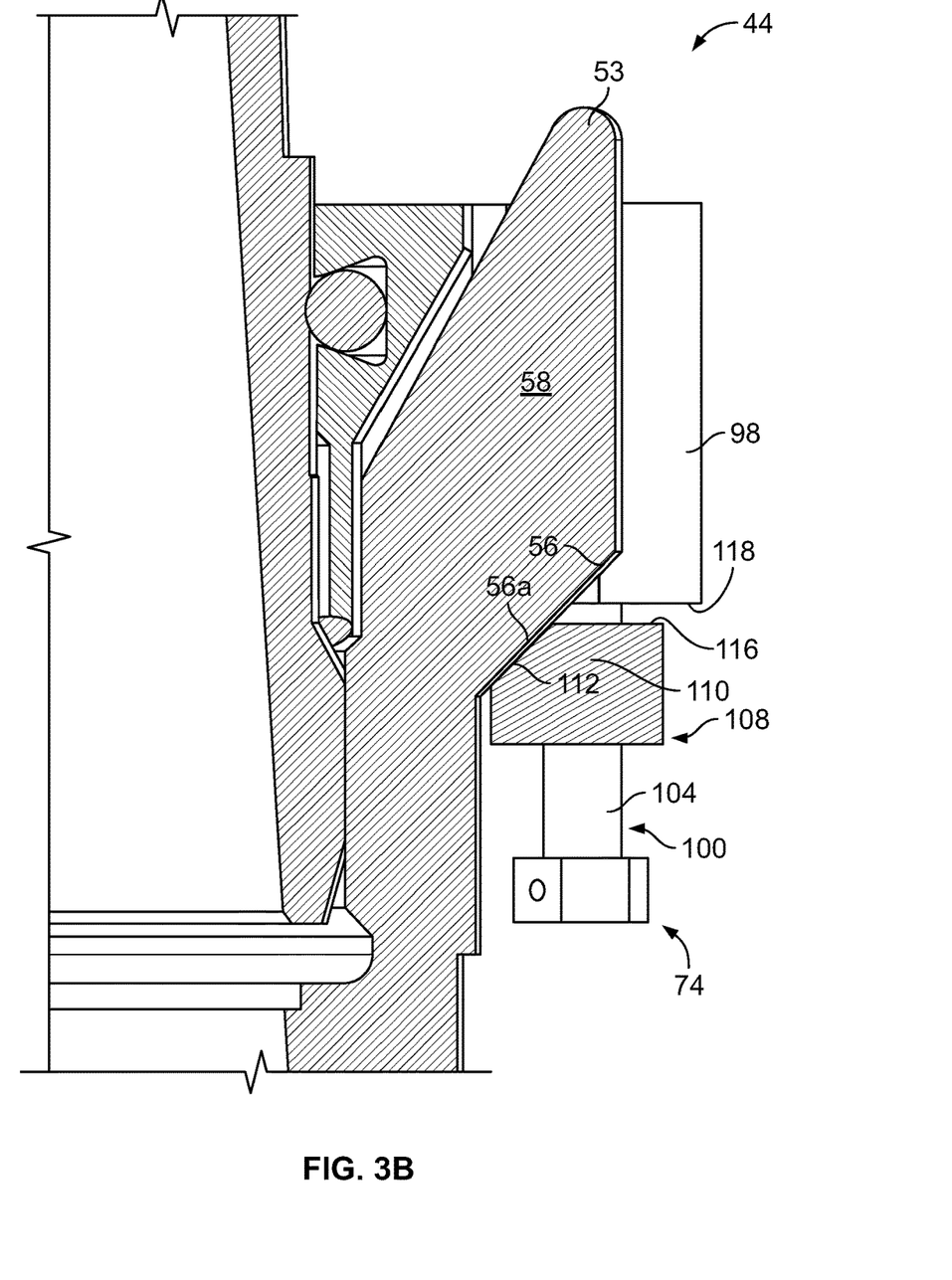
FIG. 3b shows a cross-sectional side view of the sealing device with a clamp of the sealing device in a clamping orientation axially clamping a fin of the diffuser.

FIG. 3b shows clamp 74 in a clamping orientation axially clamping fin 53. Angled surface 112 of wedge section 110 is forced longitudinally (i.e., upwardly) against first section 56a of radially outer surface 56 by shoulder screw 100 such that the upward force on fin engagement section 108 from shoulder screw 100 and the engagement between wedge section 110 and first section 56a of radially outer surface 56 holds clamping device 44 axially in place on fins 53. From the view in FIG. 3a to the view in FIG. 3b, head 102 (FIGS. 4a to 5) of shoulder screw 100 has been rotated such that threads of threaded portion 104 of shoulder screw 100 slide along the threads of the threaded bore of fin engagement section 108 to move fin engagement section 108 upwardly, with top surface 116 of fin engagement section 108 being moved closer to bottom surface 118 of connector 98. In the clamping orientation, lateral walls 120 of fin engagement section 108 each face a corresponding one of the lateral surfaces 58 of fin 53. The longitudinal engagement of fin 53 with clamp 74 forces ring 71 axially downward to fix collar 73 axially in place on inlet mixer 30.

Figure 4A:
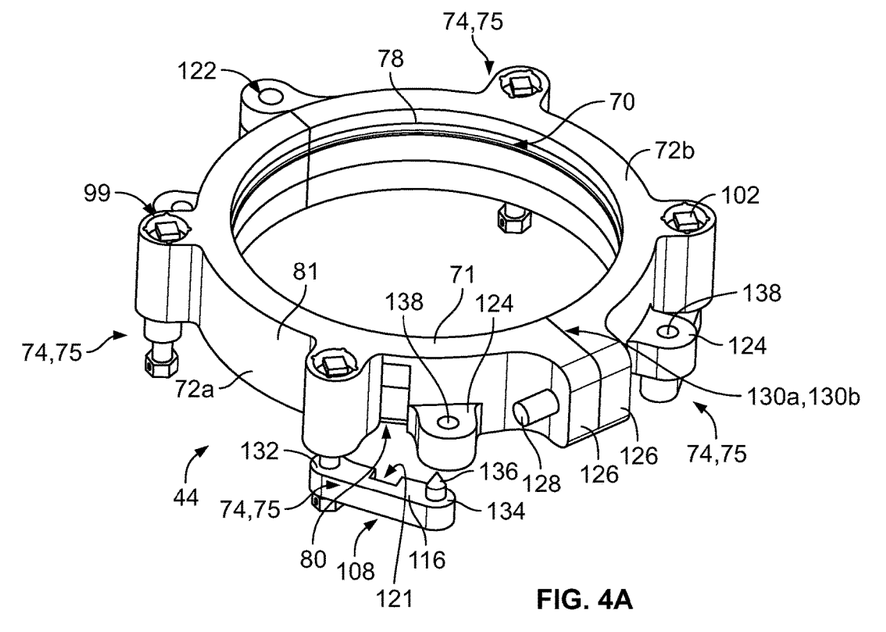
FIG. 4a shows oblique views of the sealing device with a collar of the sealing device in a closed configuration.
Figure 4B:
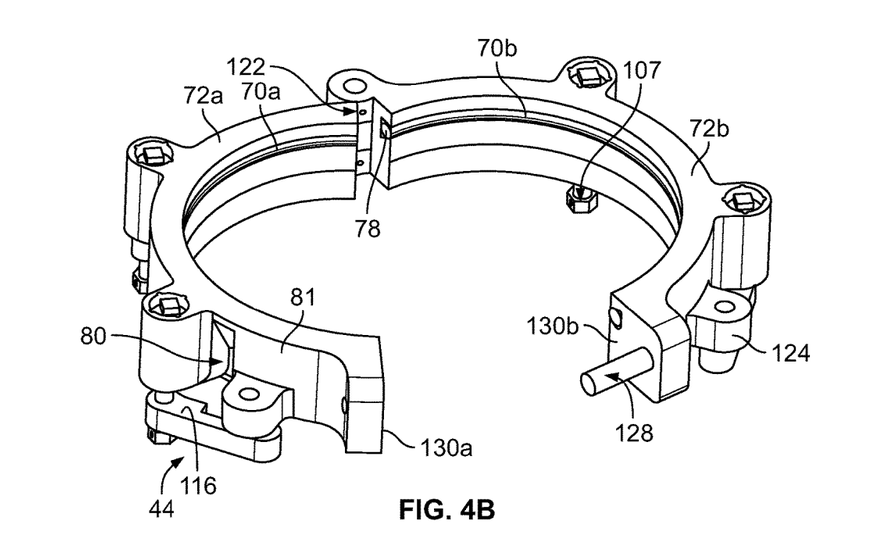
FIG. 4b shows oblique views of sealing device with the collar of the sealing device in a closed configuration.

FIGS. 4a and 4b show oblique views of sealing device 44. FIG. 4a shows collar 72 in a closed configuration and FIG. 4b shows collar 72 in an open configuration. As shown in FIGS. 4a, 4b, collar 72 includes two half sections 72a, 72b hinged together by a hinge 122. As noted above, collar 72 includes a ring 71 having outer circumferential surface 81 and a plurality of connecting features—i.e., first connectors 98, hinge 122, second connectors 124 and end connectors 126—protruding radially from outer circumferential surface 81, as well as inner circumferential surface 76 including circumferentially extending dovetail groove 78 formed therein holding first seal 70. Because collar 72 is split into half sections 72a, 72b, groove 78 is split into two half section 78a, 78b, each receiving a cylindrical tube 70a, 70b. Cylindrical tubes 70a, 70b are semicircles formed of metal in this embodiment, and when collar 72 is fixed onto mixer 30 (FIGS. 2 to 3b), compressed on mixer 30 to the point that tubes 70a, 70b permanently deform around the mixer to provide seal 70 similar to that of a metal o-ring in a radial seal configuration. To clamp half sections 72a, 72b of collar 72 together on inlet mixer 30 and radially force seal tubes 70a, 70b into outer circumferential surface 48 of inlet mixer 30, an end fastener 128 passes tangentially through bores in end connectors 126 provided at the ends of half sections 72a, 72b to hold circumferentially facing faces 130a, 130b of half sections 72a, 72b, respectively, in contact with each other.

As shown in FIGS. 4a, 4b, a first lateral end 132 of fin engagement section 108 includes the threaded bore and is connected to shoulder screw 100 and a second lateral end 134 of fin engagement section 108 is provided with a second fastener 136, in the form a tapered dowel, protruding upwardly from top surface 116. Each of the fin engagement sections 108 is pivotable about the respective shoulder screw 100 when the fin engagement section 108 is in a movable orientation, i.e., when the respective dowel 136 is not received in the respective second connector 124, to allow each fin engagement section 108 to be pivotable toward and away from the respective guiding fin 53. Clamp 134 is thus swingable about shoulder screw 100 at end 132 to move end 134 toward and away from ring 71. Wedge-shaped groove 121 is formed in fin engagement section 108 between first and second lateral ends 134. Second connectors 124 are provided on outer surface 81 of ring 71 near a bottom edge of ring 81 and each includes a bore 138 passing axially therethrough. When clamp 74 is in a clamping orientation axially clamping fin 53, as shown in FIG. 3*b*, dowel 136 is received, tapered end first, in bore 138 and top surface 116 of fin engagement section 108 contacts a bottom surface of second connector 124. When dowel 136 is engaged in bore 138 of connector 124, and the swing clamp 74 is tightened into the clamp orientation, fin engagement section 108 of clamp 74 contacts the first section 56*a* of radially outer surface 56 (FIG. 3*a*, 3*b*). The combination of the dowel 136 engagement and the threaded fastener 100 results in a clamping action that engages collar 72 to diffuser 32 (FIGS. 2 to 3*b*).

In the embodiment shown in FIGS. 4*a*, 4*b*, sealing device 44 is provided with four grooves 80, two grooves 80 in each collar section 72*a*, 72*b*, each for receiving one of fins 53 (FIG. 3*a*, 3*b*). Clamp 74 is formed by four separate clamp sections 75—one for each groove 80—and each groove 80 is formed circumferentially between one first connector 98 and one second connector 124.

Figure 5:
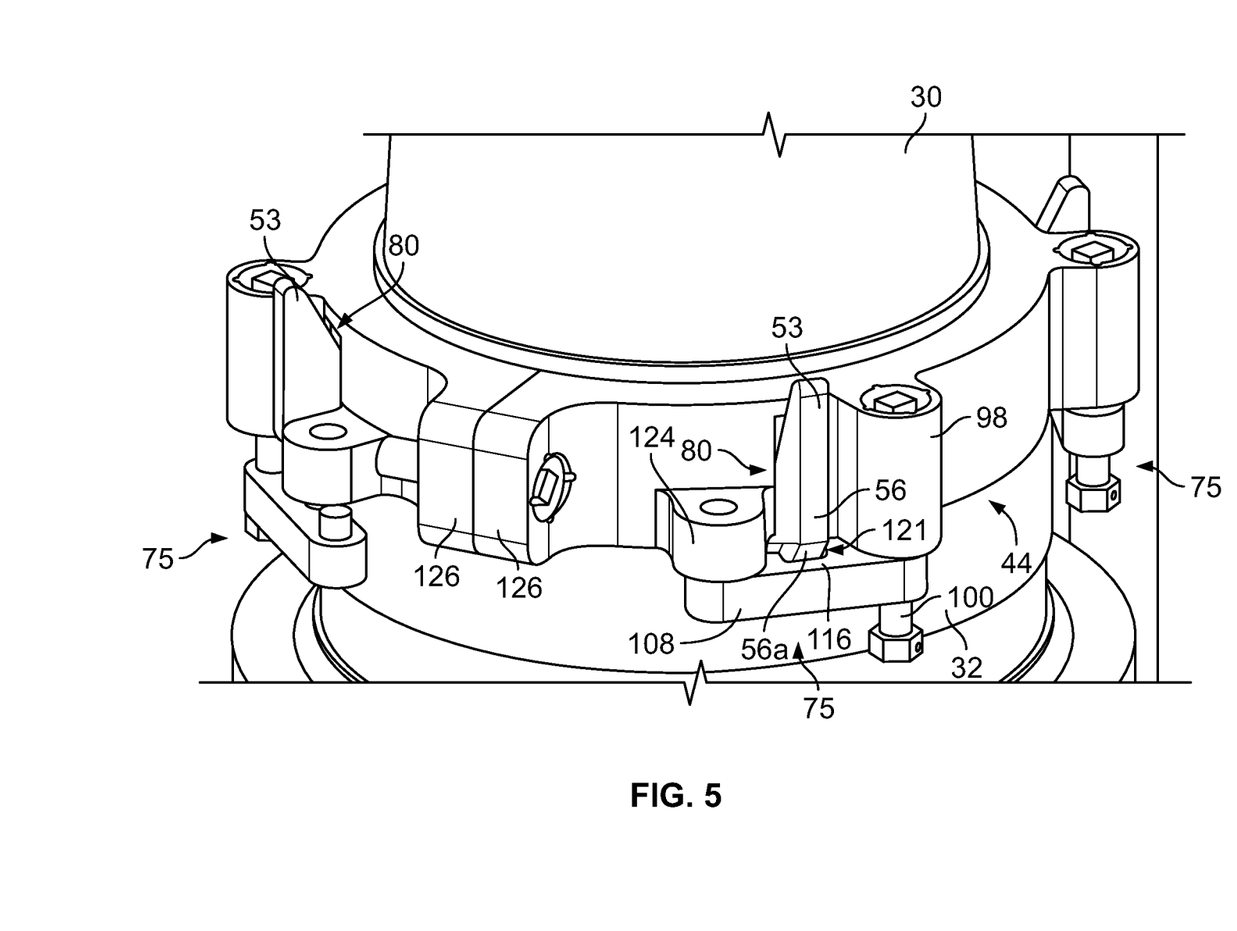
FIG. 5 shows an oblique view of the sealing device fixed to the bottom of the inlet mixer and the top of the diffuser.

FIG. 5 shows an oblique view of sealing device 44 fixed to the bottom of inlet mixer 30 and the top of diffuser 32. Sealing device 44 is positioned on inlet mixer 30 and diffuser 32 such that each fin 53 is received in one of grooves 80. For illustrative purposes, the clamp section 75 at the left side of FIG. 5 is in the unclamped orientation, while the other two clamp sections 75 shown are in the clamping orientation. With respect to the clamp sections 75 in the clamping orientation, each fin 53 is partially receiving in one wedge shaped groove 121 such that fin engagement section 108, via contact between angled surface 112 (FIGS. 3*a*, 3*b*) of engagement section 108 and first section 56*a* of radially outer surface 56 of fin 53 caused by the longitudinal, i.e., axial, clamping by shoulder screw 100, axially clamps the respective fin 53.

A method according to the embodiment of the invention shown in FIGS. 3*a* to 5, involves providing sealing device 44, in the open configuration, onto inlet mixer 30, and bringing ends 126 together while positioning sealing device 44 such that portions of collar 72, specifically sections 86, 88 at grooves 80, are positioned radially inside of fins 53, with each fin 53 being received in one of grooves 80 when collar 72 is in the closed configuration. More specifically, ring 71, at grooves 80, is positioned such that bottom section 86 of ring 71 is positioned radially between outer circumferential surface 48 of inlet mixer 30 and radially inner surfaces 54 of fins 53, second seal 92 is held against outer circumferential surface 48 of inlet mixer 30 at elbow 69 and surfaces 66, 67 adjacent to elbow 69, and the bottom edge of radially inner surface 82, at frustoconical surface 94, is axially held against inner circumferential surface 50 of diffuser 32 frustoconical surface 96. Next, end fastener 128 is provided through the tangentially extending holes in ends 126 and tightened to clamp collar half sections 72*a*, 72*b* together, which forces seal 70 radially against outer circumferential surface 48 of inlet mixer 30. Tubes 70*a*, 70*b* of seal are joined to form a complete circle that is radially compressed against outer circumferential surface 48 of inlet mixer 30. Tubes 70*a*, 70*b* are compressed on outer circumferential surface 48 of inlet mixer 30 to the point that tubes 70*a*, 70*b* permanently deform around mixer 30 to provide a seal similar to that of a metal o-ring in a radial seal configuration.

After end fastener 128 is sufficiently tight, clamp 74 is forced into the clamping orientation to axially clamp fins 53. More specifically, for each clamp section 75, shoulder screw 100 forces wedge section 110 of fin engagement section 108 axially against first section 56*a* of radially outer surface 56. The upward force on fin engagement section 108 from shoulder screw 100 and the engagement between wedge section 110 and first section 56*a* of radially outer surface 56 holds clamping device 44 axially in place on fins 53. The axially forcing is done by rotating shoulder screw 100 such that threads of threaded portion 104 of shoulder screw 100 slide along the threads of the threaded bore of fin engagement section 108 to move fin engagement section 108 upwardly, with top surface 116 of fin engagement section 108 being moved closer to bottom surface 118 of connector 98.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A sealing device for a jet pump of a boiling water reactor, the jet pump including an inlet mixer and a diffuser receiving the inlet mixer at a slip joint such that an outer circumferential surface of the inlet mixer is received in an inner circumferential surface of the diffuser at the slip joint, the diffuser including a plurality of guiding fins, each guiding fin including a radially inner surface, a radially outer surface and lateral surfaces extending radially between the inner and outer surfaces, the sealing device comprising:

a seal configured for sealingly contacting the outer circumferential surface of the inlet mixer;

a collar configured for holding the seal against the outer circumferential surface of the inlet mixer, the collar including portions configured for being received radially between the radially inner surfaces of the guiding fins and the outer circumferential surface of the inlet mixer; and a clamp configured for contacting the radially outer surfaces of the guiding fins to axially clamp the guiding fins, the clamp being formed by a plurality of clamp sections arranged radially outside of the collar, each of the clamp sections being configured for contacting a respective one of the guiding fins, each of the clamp sections including a fin engagement section configured for contacting the radially outer surface of the respective one of the guiding fins and a first fastener connected to the collar, the collar including a plurality of first connectors, each of the first connectors receiving one of the first fasteners, each of the fin engagement sections being pivotable about the respective first fastener when the fin engagement section is in a movable orientation to allow each fin engagement section to be pivotable toward and away from the respective guiding fin, the first fastener being circumferentially offset from the fin engagement section when the fin engagement section is aligned to contact the radially outer surface of the respective one of the guiding fins.

2. The sealing device as recited in claim 1 wherein the collar includes a support ring having a circumferentially extending groove formed in an inner circumferential surface thereof holding the seal.

3. The sealing device as recited in claim 1 wherein the clamp includes a plurality of grooves each being contoured to contact the radially outer surface of a respective one of the guiding fins.

4. The sealing device as recited in claim 1 wherein each of the first fasteners is configured for axially moving the respective fin engagement section toward the respective fin.

5. The sealing device as recited in claim 1 wherein the radially outer surface of each of the guiding fins includes a tapered section extending from an outer circumferential surface of the diffuser and an axially extending section extending axially from a radially outer end of the tapered section, the clamp contacting the tapered section.

6. The sealing device as recited in claim 1 further comprising a further seal connected to the collar below the seal, the further seal configured for sealingly contacting the outer circumferential surface of the inlet mixer below.

7. The sealing device as recited in claim 1 wherein a bottom edge of the collar is configured for contacting the inner circumferential surface of the diffuser.

8. The sealing device as recited in claim 1 wherein each of the clamp sections is fixed to the collar at a respective first location and a respective second location, the first location being circumferentially offset from respective guiding fin in a first direction, the second location being circumferentially offset from the respective guiding fin in a second direction that is opposite of the first direction, each of the first fasteners being connected to the collar at the respective first location.

9. The sealing device as recited in claim 8 wherein each of the clamp sections includes a second fastener extending upwardly from a top surface of the respective fin engagement section, the collar including a plurality of second connectors, each of the second fasteners being received in a respective one of the second connectors in a clamping orientation of the respective clamp section to fix the clamp section to the collar at the respective second location.

10. A method of mounting a sealing device onto a slip joint of a jet pump of a boiling water reactor, the slip joint being defined by an outer circumferential surface of an inlet mixer being received in an inner circumferential surface of a diffuser, the diffuser including a plurality of guiding fins, each guiding fin including a radially inner surface, a radially outer surface and lateral surfaces extending radially between the inner and outer surfaces, the method comprising:
providing a collar onto the outer circumferential surface of the inlet mixer;
fixing the collar of the sealing device onto the outer circumferential surface of the inlet mixer such that a seal held by the collar is compressed radially against the outer circumferential surface of the inlet mixer by the collar and portions of the collar are received radially between the radially inner surfaces of the guiding fins and the outer circumferential surface of the inlet mixer; and
forcing a clamp of the sealing device axially against the radially outer surfaces of the guiding fins to axially clamp the guiding fins, the clamp being formed by a plurality of clamp sections arranged radially outside of the collar, each of the clamp sections including a first fastener and a fin engagement section configured for contacting a respective one of the guiding fins,
the forcing of the clamp axially against the radially outer surfaces of the guiding fins to axially clamp the guiding fins including pivoting the fin engagement section of each of the clamp sections onto the respective one of the guiding fins after the collar is provided onto the outer circumferential surface of the inlet mixer, and then axially raising each of the clamp sections, each of the first fasteners being circumferentially offset from the respective fin engagement section when the first fasteners are in contact with the radially outer surfaces of the guiding fins.

11. The method as recited in claim 10 wherein the providing of the collar onto the outer circumferential surface of the inlet mixer is performed such that each of the guiding fins is partially received in one of a plurality of axially extending grooves in an outer circumferential surface of the collar.

12. The method as recited in claim 11 wherein the providing the collar onto the outer circumferential surface of the inlet mixer includes holding a further seal held by the collar onto the outer circumferential surface of the inlet mixer below the seal.

13. The method as recited in claim 11 wherein the providing the collar onto the outer circumferential surface of the inlet mixer includes holding a bottom edge of the collar axially against the inner circumferential surface of the diffuser.

14. The method as recited in claim 10 wherein the seal includes at least one cylindrical metal tube, the fixing the collar of the sealing device onto the outer circumferential surface of the inlet mixer including radially compressing the at least one cylindrical metal tube on the outer circumferential surface of the inlet mixer such that the at least one cylindrical metal tube permanently deforms around the inlet mixer.

15. The method as recited in claim 10 wherein the forcing the clamp of the sealing device axially against the radially outer surfaces of the guiding fins to axially clamp the guiding fins includes forcing, via each of the first fasteners, an angled surface of the respective fin engagement section axially against a tapered section of the radially outer surface of the respective guiding fin.

16. The method as recited in claim 15 wherein each of the clamp sections includes a second fastener, the forcing the clamp of the sealing device axially against the radially outer surfaces of the guiding fins to axially clamp the guiding fins includes forcing the second fasteners into bores in the collar.

17. The method as recited in claim 10 wherein each of the clamp sections is fixed to the collar at a respective first location and a respective second location, the first location being circumferentially offset from respective guiding fin in a first direction, the second location being circumferentially offset from the respective guiding fin in a second direction that is opposite of the first direction.

18. A sealing device for a jet pump of a boiling water reactor, the jet pump including an inlet mixer and a diffuser receiving the inlet mixer at a slip joint such that an outer circumferential surface of the inlet mixer is received in an inner circumferential surface of the diffuser at the slip joint, the diffuser including a plurality of guiding fins, each guiding fin including a radially inner surface, a radially outer surface and lateral surfaces extending radially between the inner and outer surfaces, the sealing device comprising:
a seal configured for sealingly contacting the outer circumferential surface of the inlet mixer;
a collar configured for holding the seal against the outer circumferential surface of the inlet mixer, the collar including portions configured for being received radially between the radially inner surfaces of the guiding fins and the outer circumferential surface of the inlet mixer; and a clamp configured for contacting the radially outer surfaces of the guiding fins to axially clamp the guiding fins, wherein the clamp is formed by a plurality of clamp sections, each of the clamp sections including a fin engagement section being configured for contacting the radially outer surface of a respective one of the guiding fins, wherein each of the clamp sections includes a first fastener connected to the collar configured for axially moving the respective fin engagement section toward the respective fin, wherein the collar includes a plurality of first connectors, each of the first connectors receiving one of the first fasteners, wherein each of the clamp sections includes a second fastener extending upwardly from a top surface of the respective fin engagement section, the collar including a plurality of second connectors, each of the second fasteners being received in a respective one of the second connectors in a clamping orientation of the respective clamp section.

* * * * *